(12) United States Patent
Blaalid et al.

(10) Patent No.: US 7,375,960 B2
(45) Date of Patent: May 20, 2008

(54) APPARATUS FOR REMOVABLY SECURING STORAGE COMPONENTS IN AN ENCLOSURE

(75) Inventors: Jeffrey Scott Blaalid, deceased, late of Mission Viejo, CA (US); by Kathleen A. Blaalid, legal representative, Mission Viejo, CA (US); James Pat Young, Laguna Niguel, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 429 days.

(21) Appl. No.: 11/123,353

(22) Filed: May 6, 2005

(65) Prior Publication Data

US 2006/0250766 A1 Nov. 9, 2006

(51) Int. Cl.
*H05K 5/00* (2006.01)
*H05K 7/00* (2006.01)
*G06F 1/16* (2006.01)
*A47B 81/00* (2006.01)

(52) U.S. Cl. ............... 361/685; 361/684; 361/686; 312/223.2; 312/223.3

(58) Field of Classification Search ........ 361/683–686, 361/727; 439/248, 545; 312/223.2, 223.3
See application file for complete search history.

(56) References Cited

U.S. PATENT DOCUMENTS

| | | | |
|---|---|---|---|
| 6,018,456 A | 1/2000 | Young et al. | 361/684 |
| 6,424,523 B1 * | 7/2002 | Curtis et al. | 361/685 |
| 6,490,153 B1 * | 12/2002 | Casebolt et al. | 361/685 |
| 6,498,723 B1 * | 12/2002 | Konshak et al. | 361/685 |
| 6,661,651 B1 * | 12/2003 | Tanzer et al. | 361/685 |
| 6,843,674 B1 * | 1/2005 | Young | 439/248 |
| 2003/0011981 A1 * | 1/2003 | Curtis et al. | 361/685 |
| 2003/0189811 A1 * | 10/2003 | Peeke et al. | 361/685 |
| 2003/0206402 A1 * | 11/2003 | Tsuyuki et al. | 361/725 |
| 2005/0157464 A1 * | 7/2005 | McAlister | 361/685 |
| 2005/0237707 A1 * | 10/2005 | Connelly et al. | 361/685 |
| 2006/0019520 A1 * | 1/2006 | Kawase et al. | 439/247 |
| 2006/0067042 A1 * | 3/2006 | Salinas et al. | 361/685 |

* cited by examiner

*Primary Examiner*—Lisa Lea-Edmonds
*Assistant Examiner*—Anthony M Haughton
(74) *Attorney, Agent, or Firm*—Girard & Equitz LLP (57) ABSTRACT

In some embodiments, an assembly in which storage components (e.g., at least two bare SATA disk drives) can be removably secured. The assembly can secure bare storage components in an enclosure without the need first to mount any of them in or to a carrier, and such that they can be conveniently removed from the enclosure and replaced (e.g., when they fail). Some embodiments include a flexible assembly for each storage component, including at least one flexible element and at least one swaged cam for each flexible element. The flexible assembly has two states: a locking state in which each cam deforms a flexible element into a locking position; and an unlocking state in which each cam and each flexible element have relative positions that allow the storage component to move past each flexible element. Other embodiments include a spring-biased assembly for each storage component, having a locking state in which at least one spring element (e.g., a metal flange) exerts spring force on the storage component to maintain it in a locked position; and an unlocking state in which each spring element has relaxed away from the storage component to allow the storage element to move out of the locked position.

28 Claims, 9 Drawing Sheets

APPARATUS FOR REMOVABLY SECURING STORAGE COMPONENTS IN AN ENCLOSURE

FIELD OF THE INVENTION

The present invention relates to apparatus for removably securing one or more storage devices in an enclosure with at least one connector of each storage device accessible for coupling to (and decoupling from) a complementary connector. In some embodiments, the invention relates to apparatus for removably securing two or more bare SATA (serial ATA) storage devices in an enclosure, with a SATA connector of the storage device accessible for coupling to (and decoupling from) a complementary connector of a SATA cable.

BACKGROUND OF THE INVENTION

The following definitions apply throughout the specification, including in the claims:

"SATA standard" denotes the standard known as Serial ATA, Revision 1.0, adopted on Aug. 29, 2001, by the Serial ATA Working Group, for communication between a host and one or more storage devices over one or more serial links;

"SATA system" denotes a system including elements (sometimes referred to as "SATA components") configured for communication over at least one serial link in compliance with the "SATA" standard;

"RAID" system denotes a system including at least one host (e.g., a CPU), at least two storage devices, and a controller (a RAID controller) coupled between the host and the storage devices to provide an interface between the host and the storage devices. Thus, the expression "RAID" system is used herein more broadly than in a conventional sense in which it denotes a system including at least one host, a "redundant array of inexpensive disks" (an array of inexpensive disk drives), and a controller coupled between the host and disk drives to provide an interface between the host and disk drives;

a "swaged" element denotes that the element is shaped for deforming another element into a complementary shape. For example, a "swaged" cam herein denotes a cam shaped and configured to be capable of deforming another element into a shape complementary to the cam's shape (e.g., temporarily deforming a flexible element into the complementary shape such that the flexible element can later move or be moved back into its original shape); and "enclosure" (for one or more storage devices) denotes a structure in which each storage device can be removably secured. The term "enclosure" is used broadly to denote either a structure that can enclose a storage device completely (on all sides) or a structure that does not completely enclose a storage device.

The expressions "storage devices" and "storage components" are used interchangeably herein (as synonyms).

The expressions "assembly" and "apparatus" are used interchangeably herein (as synonyms). It is not intended that an "assembly" or "apparatus" necessarily consists of discrete structures that are assembled together to manufacture it.

Figure 1:
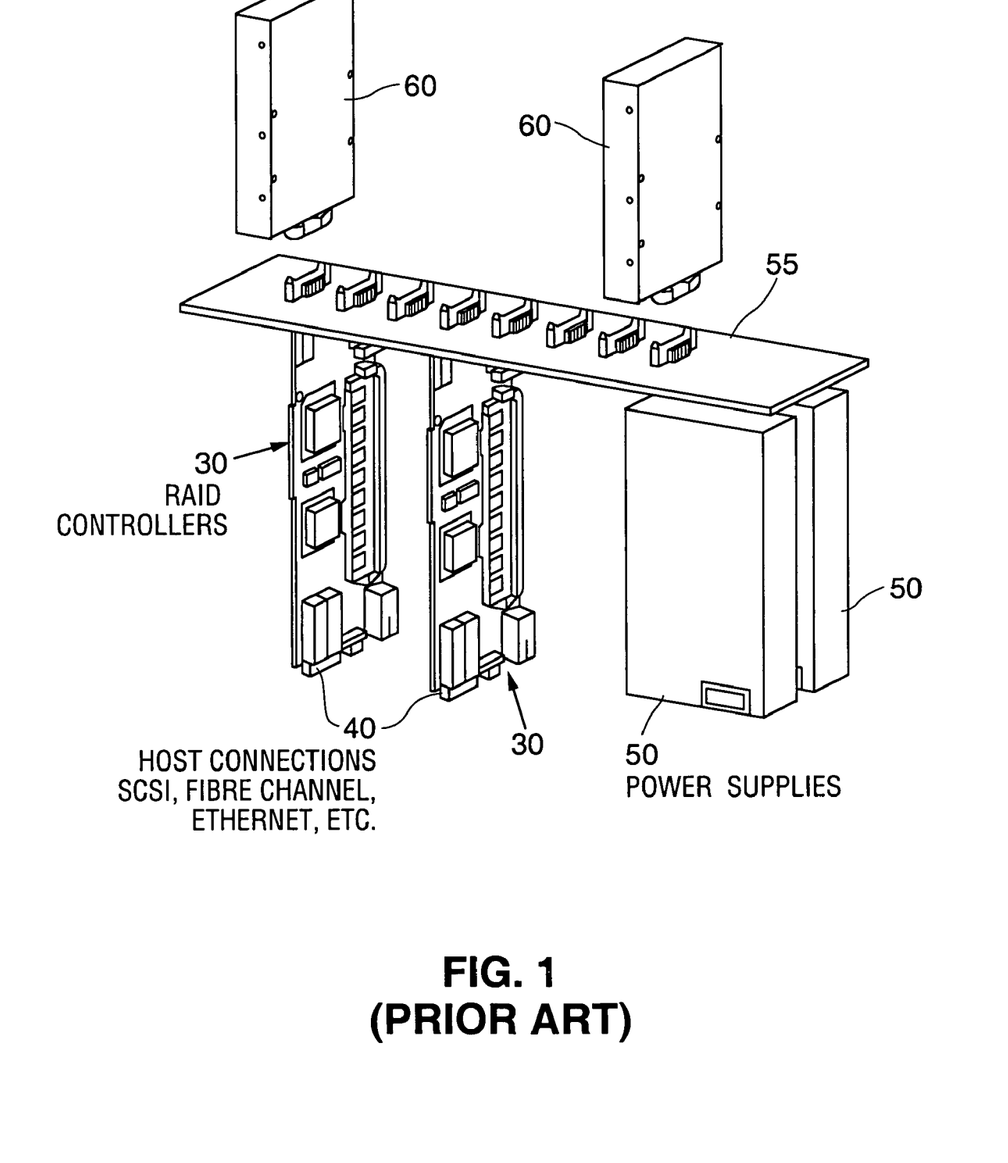
FIG. 1 is a perspective view of elements of a conventional system (including two storage devices 60) for managing data in a multi-storage component environment.

Banks, hospitals, government institutions, public institutions and similar entities often employ multi-storage component systems to manage their data. Due to the importance of the data, data loss (e.g., due to a hard disk drive failure) cannot be tolerated. In some conventional systems for managing data in a multi-storage component environment, a RAID controller manages data transmission over a serial link between multiple storage units and a host server (e.g., a personal computer). In FIG. 1 (an example of such a system), each of RAID controllers 30 includes a host connection 40 which is configured to be coupled to a host (not shown in FIG. 1) via a serial link. In various implementations of the FIG. 1 system, host connection 40 can be implemented to be compatible with any of several different types of serial links, including SCSI (small computer system interface), fibre channel, ethernet, and firewire (IEEE standard 1394) links. Each RAID controller 30, which can be implemented as a commercially available RAID controller (e.g., one available from CMD Technology Inc. of Irvine, Calif.), performs a multiplexing function to distribute data over several storage components (e.g., in a striping arrangement). If one storage component fails to function properly, a RAID controller 30 prevents the loss of data stored on the failed storage component.

In the FIG. 1 system, each RAID controller 30 can be coupled to two (or more) storage components 60, and each storage component 60 is coupled to one of power supplies 50. More specifically, each of RAID controllers 30, storage components 60, and power supplies 50 is connected to backplane 55 (sometimes referred to as a "midplane"), and backplane 50 provides the appropriate connections between components 60 and RAID controller 30 and between components 60 and power supplies 50. Typically, host connection 40 is a SCSI or fibre channel type connection since such a connection allows multiple storage components to be connected to a host server 20: up to 125 storage components for fibre channel and up to 14 storage components in the case of SCSI.

While the SCSI and fibre channel standards support multi-storage system environments, the associated SCSI and fibre channel storage components are four to six times more expensive than the traditional IDE (integrated device electronics) storage components that are used in most PC's. The IDE standard only supports the connection of two IDE storage components, however, and is therefore not ideal for use in a multi-storage component environment.

SATA systems have been developed as a next generation standard replacement for IDE. SATA storage components are similar in cost to IDE storage components. However, the SATA standard requires tight impedance control for on board signal routes and as a result SATA storage components cannot simply be plugged into a circuit board substrate due to potential distortion. Due to their low cost, it is desirable to use SATA storage components in a multi-storage component environment. U.S. Pat. No. 6,843,674, issued Jan. 18, 2005, describes a cable (having a connector configured to be coupled to a complementary connector of a SATA component) and other hardware for connecting SATA storage components to other components in a multi-storage environment.

SATA connectors (for connecting SATA storage components to other components such as controllers and power supplies) have many desirable characteristics including the following: a SATA connector has a low pin count, supports lower operating voltages and higher data transfer rates than IDE, and can be used with very thin and flexible cables.

Among the disadvantages and limitations of conventional systems that include a backplane (e.g., backplane 55 of FIG. 1) for connecting storage devices to other elements are that a backplane typically is undesirably bulky, and since component location is fixed due to the use of plug-in boards with a backplane, system design is constrained.

To eliminate such disadvantages and limitations, it would be desirable to implement a system in which SATA storage components (or other storage components) are connected in a multi-storage component environment without the use of plug-in boards or a backplane.

A system of this type is described in above-cited U.S. Pat. No. 6,843,674. A system very similar to the one described in U.S. Pat. No. 6,843,674 will next be described with reference to FIGS. 2 and 3.

Figure 2:
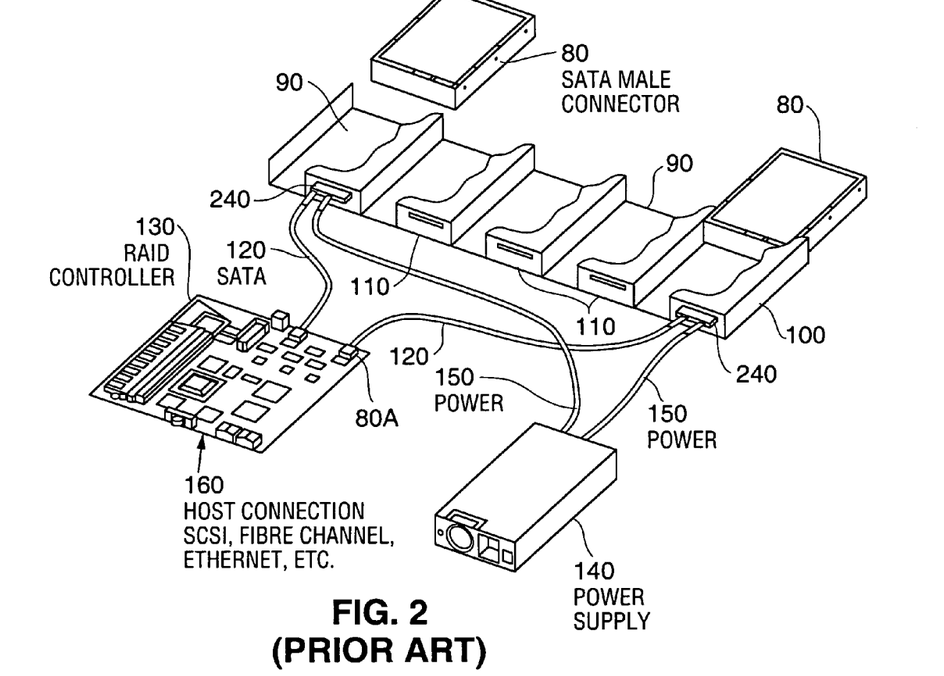
FIG. 2 is a perspective view of elements of a conventional multi-storage component system including two SATA storage devices 80 and a RAID controller 130.
Figure 3:
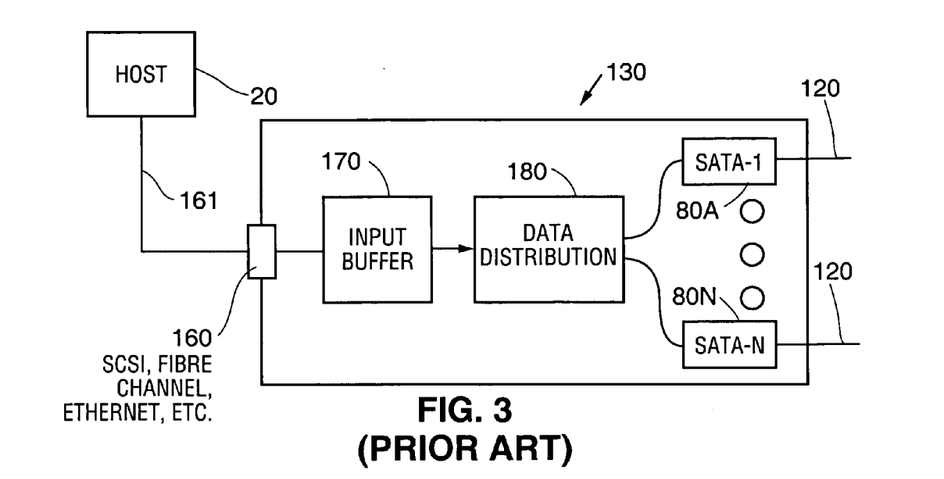
FIG. 3 is a block diagram of elements shown in FIG. 2, with a host (20) and a serial link (161) between host 20 and RAID controller 130.

The system of FIGS. 2 and 3 includes SATA storage components 80 (which can be disk drives), and chassis 100 having bays 90 for receiving the components 80. At the end of each bay 90, chassis 100 has an opening 110 into which one end of a SATA cable 120 and to one end of a power cable 150 (or a specialized connector coupled to one end of a SATA cable 120 and one end of a power cable 150) can be inserted so that the SATA and power cables (or specialized connector) can be coupled to a complementary connector of a component 80 in the bay 90. The other end of each such SATA cable 120 plugs into an appropriate connector of RAID controller 130, and the other end of each such power cable 150 plugs into power supply 140. RAID controller 130 includes a host connection 160 which is configured to be coupled to a serial link (e.g., serial link 161 of FIG. 3) to allow communication via the serial link between controller 130 and a host (e.g., host computer 20 of FIG. 3). RAID controller 130 regulates the flow of data between the host and each of the SATA storage components 80 via the serial link (to the host) and cables 120. Host connection 160 can be implemented to be compatible with any of several different types of serial links, including SCSI (small computer system interface), fibre channel, ethernet, and firewire (IEEE standard 1394) links.

RAID controller 130 also includes a SATA connector 80A (shown in FIGS. 2 and 3) for each of bays 90. One end of each of the SATA cables 120 can be coupled to each of SATA connectors 80A. Data from host 20 propagates over serial link 161 to host connection 160, and from host connection 160 to input buffer 170 of RAID controller 130. The data are distributed to SATA storage components 80 via data distribution component 180 of RAID controller 130. As will be apparent to those of ordinary skill in the art, input buffer 170 can be a standard, high impedance input buffer and distribution component 180 can be implemented to include at least one multiplexer, electronic switch, or similar device.

It would be desirable to removably secure storage components 80 in chassis 100 of FIG. 2, so that each storage component can be locked into a position with its SATA and power connector aligned with slot 110 so that the storage component can be coupled to SATA and power cables (or to a connector coupled to such cables) and then decoupled from the cables (or connector) when desired, and so that the storage component can be unlocked and removed from the chassis (after being decoupled from the cables or connector). More generally, it would be desirable to removably secure storage components (e.g., SATA storage devices) in a chassis or other enclosure (using simple, inexpensive hardware, and without the need to mount any of the storage components in or to an individual disk carrier or other carrier), so that each storage component can be locked into a position for convenient coupling to a connector (e.g., a connector of or coupled to a SATA cable or other serial link) and then decoupling from the connector, and so that each storage component can be unlocked and removed from the enclosure (after being decoupled from the connector).

SUMMARY OF THE INVENTION

In a class of embodiments, the invention is an assembly in which SATA disk drives (or other storage components) can be removably secured, with at least one connector of each storage component accessible for coupling to (and decoupling from) a complementary connector. In accordance with typical embodiments of the invention, bare storage components (e.g. inexpensive SATA disk drives or other inexpensive storage components) can be secured in an enclosure without the need first to mount any of them in or to an individual carrier, and such that they can be conveniently removed from the enclosure and replaced (e.g., when they fail). The expression that a storage component is a "bare" storage component herein denotes that the storage component is not mounted in or to a tray, an individual disk carrier, or other carrier or support structure. In typical embodiments, one or more bare storage components (e.g., bare SATA disk drives) are removably secured in an enclosure.

In some embodiments, locking assemblies are provided in an enclosure for removably securing each of two or more storage components (e.g., SATA disk drives) in the enclosure, and a controller (e.g., a SATA controller) is mounted in the enclosure. Each locking assembly is configured allow each storage component to be inserted in the enclosure and conveniently coupled to a connector at one end of cable (e.g., a SATA cable). Another end of each such cable is coupled to the controller. Typically also, one end of a host-connection cable is coupled (e.g., by a floating SATA connector) to the controller so that an external host can be coupled to the other end of the host-connection cable. Typically, each storage component in the enclosure can be coupled to the controller in any of a variety of different ways. In some but not all implementations, each storage component is coupled to the controller by a cable having a floating connector that engages the storage component.

In some embodiments, each storage component is removably secured in an enclosure by a flexible assembly including at least one flexible element (e.g., a flexible portion of a wall) and at least one swaged cam for each flexible element. The flexible assembly has two states: a locking state in which each cam deforms a flexible element (e.g., by pushing the flexible element) into a locking position; and an unlocking state in which each swaged cam is positioned relative to each flexible element to allow the storage component to move past each flexible element (e.g., there is sufficient clearance between each swaged cam and each flexible element to allow the storage component to move past each flexible element). Optionally, the storage component displaces each flexible element out of the way as it moves past the flexible element. Typically, the flexible assembly is moved between the two states (and each swaged cam thereof is moved between locking and retracted positions) by translating (pushing or pulling) and/or pivoting an arm relative to the enclosure.

In some embodiments, at least one storage component is removably secured in an enclosure by a spring-biased assembly having two states: a locking state in which at least one spring element (e.g., a metal flange) exerts spring force on the storage component to maintain the storage component in a locked position; and an unlocking state in which each spring element has relaxed away from the storage component to allow the storage element to move out of the locked position. Typically, the spring-biased assembly is moved between the two states by pivoting an arm.

In a class of embodiments, an enclosure in which at least one storage component (e.g., two or more bare storage components) can be removably secured has an opening for each storage component. A "floating" connector of a cable (e.g., a floating SATA connector of a SATA cable) is positioned in the opening (e.g., with a flange inside the enclosure and a second flange outside the enclosure) with limited freedom to move (float) relative to the enclosure, but so that the floating connector cannot be pulled or pushed out of the opening simply by the action of coupling a complementary connector to (or decoupling a complementary connector from) the floating connector. For example, a bare SATA storage component (having a fixed connector) being inserted into the enclosure can be coupled conveniently to a floating SATA connector that is positioned in an opening of the enclosure, and the storage component can then be locked within the enclosure in accordance with the invention. Above-cited U.S. Pat. No. 6,843,674 describes a floating SATA connector of a type useful in the embodiments mentioned in this paragraph, and such floating SATA connector is also described in the present specification with reference to FIGS. 4-6.

In other embodiments, a storage component that is to be (or has been) fixedly secured in an enclosure in accordance with the invention is coupled to a non-floating connector of a cable. In some such embodiments, a wall of the enclosure defines an opening into which the non-floating connector is inserted, and this wall has a floating section having limited freedom to move relative to the storage component and the rest of the enclosure. When the non-floating connector has been inserted into the opening of the floating section of the wall, the non-floating connector and floating section of the wall can be moved together (as a unit) relative to the storage component to allow the non-floating connector to be coupled easily to a complementary connector of a storage component within the enclosure.

DETAILED DESCRIPTION OF THE INVENTION

Figure 4:
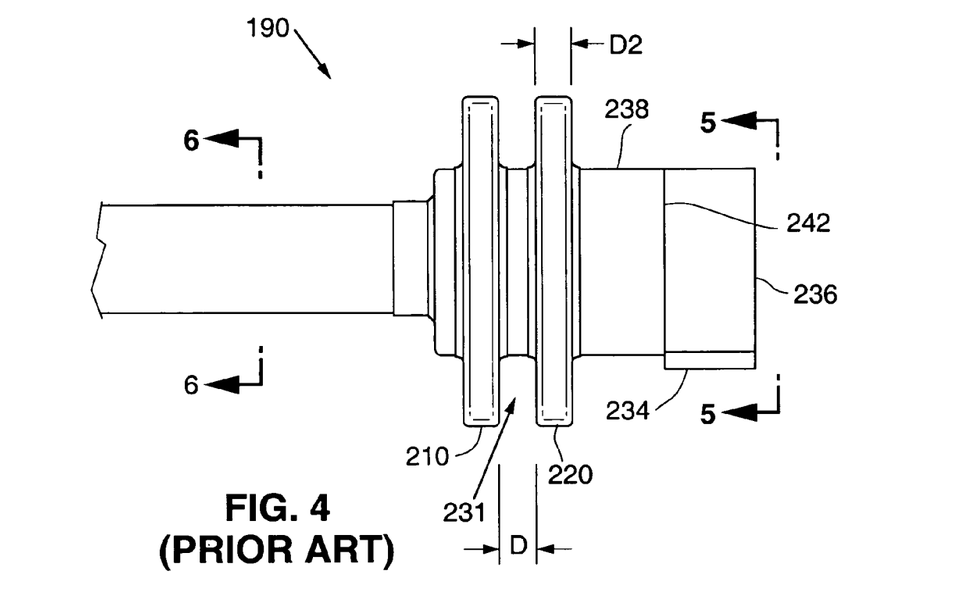
FIG. 4 is an elevational view of an end portion of a SATA cable (of a type described in U.S. Pat. No. 6,843,674) that can be coupled to one type of SATA storage component that has been secured in accordance with the present invention.
Figure 5:
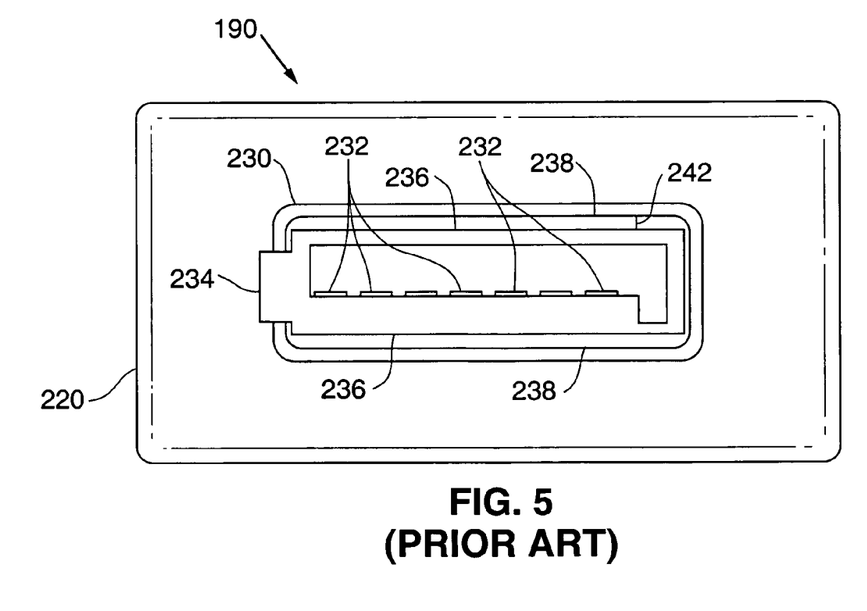
FIG. 5 is an end view of the FIG. 4 cable as seen along line 5-5 of FIG. 4.
Figure 6:
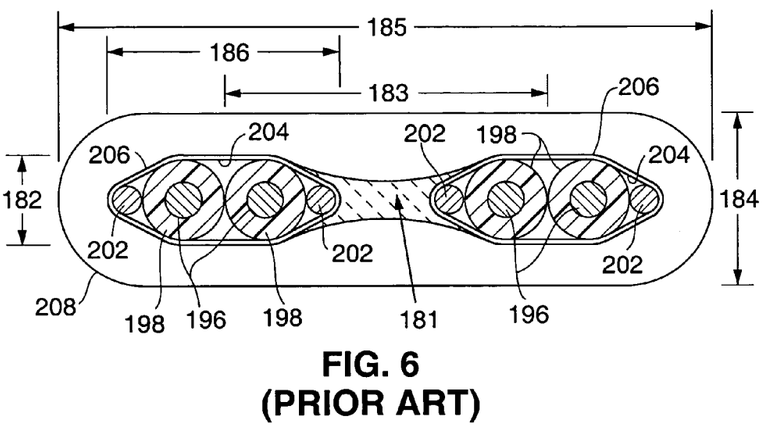
FIG. 6 is a cross-sectional view of the FIG. 4 cable along line 6-6 of FIG. 4.

With reference to FIGS. 4, 5, and 6, we describe a SATA cable (190) that can be coupled to a typical SATA storage component that has been (or is to be) secured in an enclosure in accordance with a class of embodiments of the present invention. To manufacture SATA cable 190, flanges 210 and 220 are attached in the positions shown to a conventional SATA cable comprising all other elements (all elements other than flanges 210 and 220) shown in FIGS. 4-6. Restraining flange 220 is sized and shaped so that it can pass through opening 110 of chassis 100 (if tilted sufficiently), so that flanges 220 and 210 (respectively) rest adjacent to the interior and exterior sides of the wall defining opening 110, and so that cable 190 cannot easily be tilted to allow flange 220 to pass back out through opening 110. The opening 110 is sized to have smaller height than do flanges 210 and 220 but greater height than the rest of cable 190. As a result, the flanges 210 and 220 loosely hold connector 190 (with freedom to "float") relative to opening 110. An advantage of the small amount of float provided by the described design is that it enables a fixedly secured SATA storage component (e.g., a component fixedly secured within one of bays 90) to be more easily engaged with and coupled to cable 190. If both cable 190 and the storage component instead had fixed position relative to each other, there would need to be nearly perfect alignment between cable 190 and a mating SATA connector on the storage component to couple one to the other.

FIG. 5 is an end view of cable 190 as seen along line 5-5 of FIG. 4, in which the distal face of restraining flange 220 (the right face of flange 220 when viewed as in FIG. 4) is visible. The end of cable 190 defines a female connector (having contacts 232) adapted to engage a mating connector of a SATA storage component 80.

FIG. 6 is a cross-sectional view of cable 190 along line 6-6 of FIG. 4. Shielded wire pairs 196 can be constructed out of 26 AWG (American Wire Gauge) solid tinned copper or the like. Shielded wire pairs 196 of cable 190 are preferably surrounded by a white foam polyolefin 198. Additionally, parallel wire pairs 202 are constructed out of 28 AWG solid tinned copper or the like. Each set of shielded wire pairs 196, white foam polyolefin 198 and parallel pairs 202 is preferably all surrounded by an aluminized polyester foil layer 204. Both sets of shielded wire pairs 196, white foam polyolefin 198, parallel pairs 202 and aluminized polyester foil layer 204 are preferably surrounded by a heat-sealed longitudinal wrap 206. Jacket 208 surrounds the heat sealed longitudinal wrap 206, and is preferably significantly thicker than the wrap 206. Jacket 208 can be made from PVC or the like. Region 181, defined by the dashed lines, can be devoid of material or filled in with a dielectric. Dimension 184 is preferably about 0.0465 inches, dimension 183 is preferably about 0.150 inches, dimension 184 is preferably about 0.0865 inches, dimension 185 is preferably about 0.305 inches and dimension 186 is preferably about 0.115 inches.

With reference again to FIG. 4, restraining flanges 210 and 220 are separated by a distance "D" which defines a space 231. The distance D is somewhat greater than the thickness of the wall of bay 90 that defines opening 110. This wall of bay 90 typically has thickness of about 1.2 mm and can be made out of sheet metal or the like. The distance D provides float that in turn provides cable 190 with limited freedom to move relative to bay 90 and allows cable 190 to be coupled easily to a fixedly secured (or mounted) SATA storage component as previously described. Flanges 210 and 220 preferably have thickness D2 in the range from about 0.85 to 1.45 mm. In a preferred embodiment, D2 is about 1.35 mm.

With reference again to FIG. 5, connector tab 234, adjacent to connector end 236, ensures a snug fit of cable 190 with a mating SATA connector of a SATA storage component. Connector tab 234 is slightly thinner than connector end 236. A mating connector on an SATA storage component is formed in a manner such that the opening, on the mating connector, matches the shape of connector end 236 and as a result, a tight connection is established. Additionally, connector end 236 is slightly thinner than connector section 238. This results in a step 242 at the boundary of connector section 238 and connector end 236. A mating connector on an SATA storage component is also formed in a manner that the opening matches the shape of the connector end 236 in combination with the connector tab 234. The step 242 functions as a stop-guide because once the step 242 is flush with a mating connector on an SATA storage component, cable 190 is fully in contact with an SATA storage component.

Additional details of preferred implementations of cable 190 (and cables similar to cable 190) are described in above-cited U.S. Pat. No. 6,843,674. In some preferred implementations of a cable having a floating connector, a guide structure is coupled to the distal (free) end of the floating connector to guide a complementary connector into proper alignment for coupling to the floating connector. A typical guide structure has ramped surfaces positioned to face such a complementary connector and guide it into proper alignment for coupling to the floating connector.

A cable having a "floating" connector at one end (e.g., SATA cable 190 having the floating SATA connector described with reference to FIGS. 4-6) can be removably coupled to a storage component that is to be (or has been) secured within an enclosure in accordance with the invention. A "floating" connector of a cable (e.g., a floating SATA connector of a SATA cable) is positioned in the opening (e.g., with a flange inside the enclosure and a second flange outside the enclosure) with limited freedom to move (float) relative to the enclosure, but without freedom to be pulled or pushed out of the opening simply by the action of coupling a complementary connector to (or decoupling a complementary connector from) the floating connector. For example, a bare SATA storage component (having a fixed connector) being inserted into the enclosure can be conveniently coupled to a floating SATA connector that is positioned in an opening of the enclosure, and the storage component can then be locked within the enclosure in accordance with the invention. The floating SATA connector preferably has sufficient freedom to move relative to the enclosure (and the opening of the enclosure in which the floating connector is positioned) such that the floating connector can easily be coupled to a complementary connector of a storage component within the enclosure, but not so much freedom that the floating connector's distal end can easily be pulled away from the enclosure opening (e.g., when a storage component to which it is coupled is removed from within the enclosure).

Various storage components that have been secured within enclosures in accordance with the invention can be connected to different types of cables. It is contemplated that cables having floating connectors will be used for this purpose in some but not all embodiments. In some embodiments, a non-floating connector is coupled to a storage component within an enclosure, and the storage component is then fixedly secured in the enclosure in accordance with the invention. For example, in some such embodiments, a wall of the enclosure defines an opening into which the non-floating connector is inserted, and this wall has a floating section having limited freedom to move relative to the storage component and the rest of the enclosure. When the non-floating connector has been inserted into the opening of the floating section of the wall, the non-floating connector and floating section of the wall can be moved together (as a unit) relative to a storage component within the enclosure to allow the non-floating connector to be coupled easily to a complementary connector of the storage component.

In some embodiments, a controller (e.g., SATA controller 411 of FIG. 7) is mounted within an enclosure, two or more storage components (e.g., components 400, 401, and 402 of FIG. 7) are fixedly but removably secured in the enclosure in accordance with the invention, and a floating connector (e.g., a floating SATA connector) at one end of a cable is coupled to the controller (e.g., so that an external host can be coupled to the other end of the cable). Each storage component in the enclosure is coupled to the controller in any appropriate manner (possibly but not necessarily by cables having floating connectors).

Next, with reference to FIGS. 7, 8, 8A, and 9-15, we will describe examples of the inventive apparatus for removably securing storage components in an enclosure. In typical embodiments, each storage component is "bare" in the sense that it is not mounted in or to an individual disk carrier (or other carrier) before it is secured in the enclosure in accordance with the invention. The invention allows storage components (e.g. inexpensive SATA disk drives or other inexpensive storage components) to be secured in an enclosure, without the need first to mount any of them in (or to) an individual carrier, and such that they can be conveniently removed from the enclosure and replaced when desired (e.g., when they fail).

Figure 7:
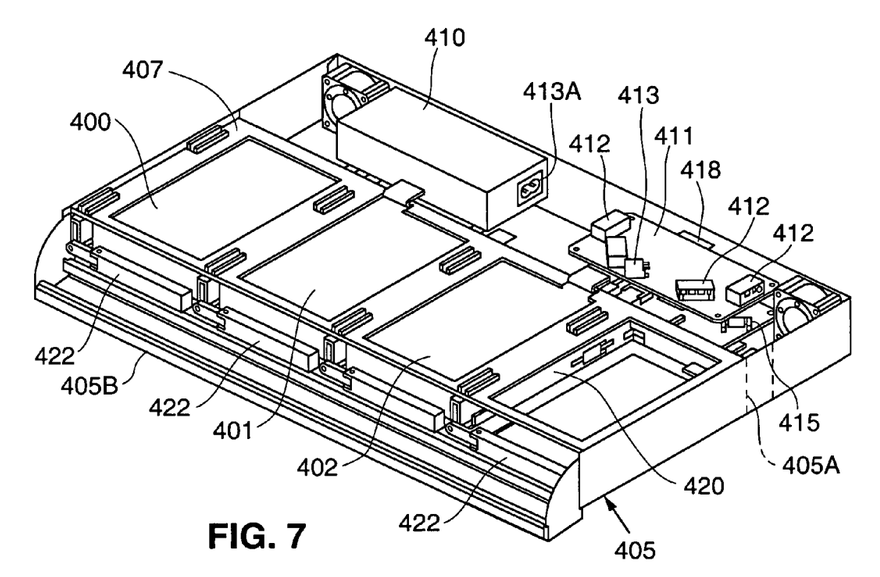
FIG. 7 is a perspective view of an enclosure (with its top cut away) with SATA storage components 400, 401, and 402 removably secured therein (in accordance with an embodiment of the invention) and additional elements mounted therein.
Figure 8:
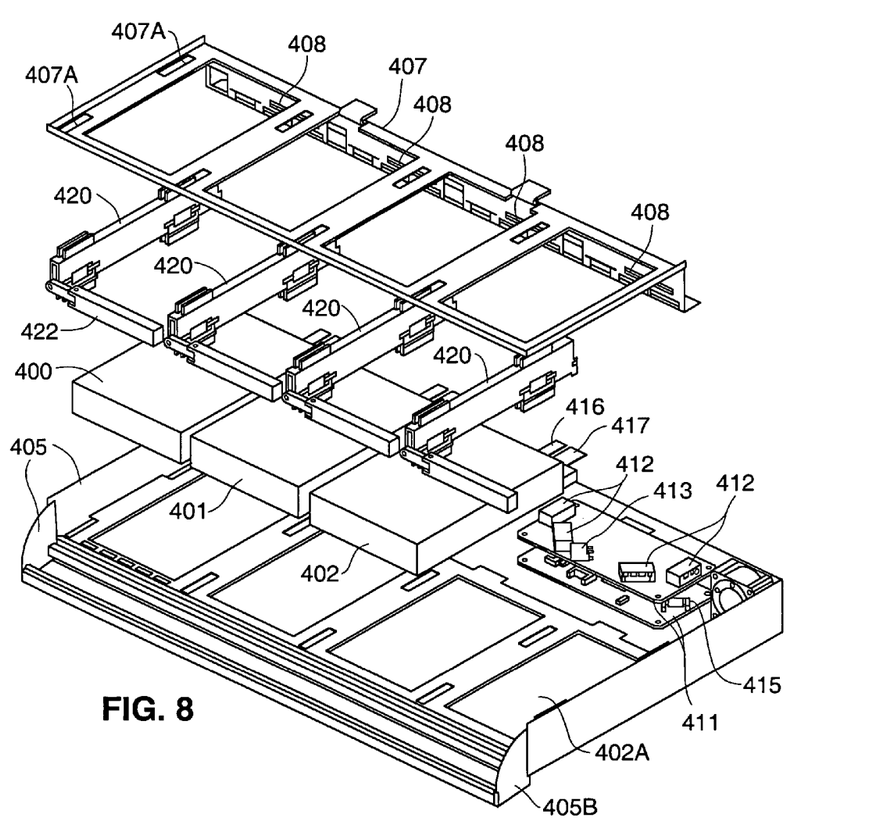
FIG. 8 is an exploded view of the FIG. 7 structure.

In the embodiment of FIGS. 7, 8, 8A, and 9-11, bare SATA disk drives 400, 401, and 402 are removably secured in an enclosure by a flexible assembly including flexible elements (i.e., flexible portions of a wall) and a swaged cam for each flexible element. As shown in FIGS. 7 and 8, the enclosure includes body 405 and frame 407 (fixedly attached to body 405). A pivoting front door portion 405B of body 405 can be opened (as shown in FIGS. 7 and 8) to allow a disk drive to be inserted into or removed from the enclosure, or it can be closed (by pivoting door portion 405B by ninety degrees from the orientation shown in FIG. 7) to cover the front of body 405 (to protect any disk drive within the enclosure). Typically also, the enclosure includes a top portion fixedly attached (and optionally removably attached) to body 405 and/or frame 407 to cover the rest of the assembly. The top portion of the enclosure is omitted from FIGS. 7 and 8 to avoid obscuring other elements of the assembly.

One, two, three, or four SATA disk drives can be removably secured in the enclosure in accordance with the invention. In FIGS. 7 and 8, three such disk drives (400, 401, and 402) are shown, but one or two of these could be omitted and a fourth disk drive could be secured in the enclosure (over the space labeled 402A in FIG. 8).

In a typical implementation of the FIG. 7 assembly (and in other typical embodiments of the invention), each storage component removably secured in an enclosure in accordance with the invention is a disk drive (e.g., a SATA disk drive) having a standard small form factor (e.g., 3.5 inch diameter and 1 inch height).

As shown in FIGS. 7 and 8, SATA controller 411 and power supply 410 are fixedly mounted within the enclosure. SATA controller 411 includes two vertically separated circuit boards, four SATA power connectors 412 on the upper circuit board, five SATA data connectors 415 (only one of which is labeled in the Figures) on the lower circuit board, power cable connector 413 on the upper circuit board, and additional circuitry. Each SATA disk drive within the enclosure includes a connector (or connectors) to which a SATA data cable 416 (one of which is labeled in FIG. 8) and a SATA power cable 417 (one of which is labeled in FIG. 8) can be connected. Preferably, an end of each such data cable 416 is inserted through one of openings 408 in frame 407, and the cable 416 is coupled (by connectors at both ends of the cable) between a SATA connector of one of the disk drives and one of connectors 415 of controller 411.

Figure 8A:
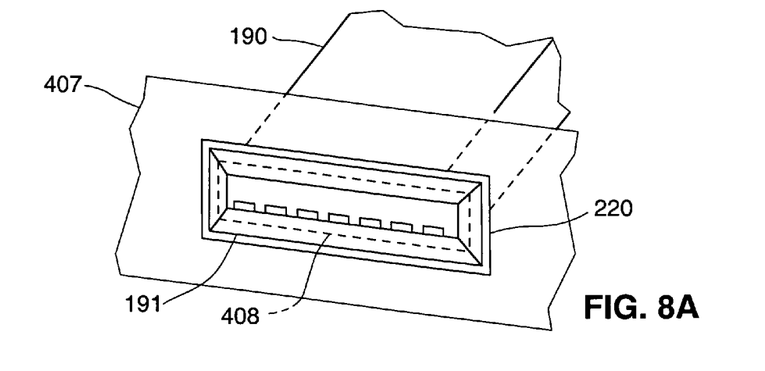
FIG. 8A is a perspective view of a portion of one implementation of the FIG. 7 structure, showing a floating connector with a guide structure positioned in an opening (opening 408) of frame 407 of FIG. 7.

In one implementation, each data cable 416 is implemented to be identical to above-described cable 190, but with a guide structure attached to the floating connector of cable 190. For example, the floating connector of each such cable 190 can be inserted in one of openings 408 of frame 407 as shown in FIG. 16. In FIG. 8A, flange 220 of cable 190 has been inserted inside frame 407 through opening 408. The opening 408 is shown in phantom view to indicate that it is behind flange 220, and the rest of cable 190 (including flange 210) is outside frame 407. A guide structure 191 (inside frame 407) is coupled to the distal end of cable 190's floating connector. Guide structure 191 has ramped surfaces shaped and positioned to face a complementary connector of one of the disk drives (e.g., one of drives 400, 401, and 402) being inserted the enclosure, and to guide the complementary connector into proper alignment with cable 190's floating connector for coupling to the floating connector. Flange 220 would prevent cable 190 from being pushed out of the opening 408 in response to the pushing force exerted thereon by such an advancing disk drive (during coupling of the drive to cable 190's floating connector). Similarly, flange 210 of cable 190 (outside frame 407, and thus not visible in FIG. 8A) would prevent cable 190 from being pulled out of the opening 408 in response to pulling force exerted thereon by a disk drive being removed from the enclosure (during decoupling of the drive from cable 190's floating connector).

The fifth connector 415 of controller 411 faces opening 418 in the back wall of body 405, and can be coupled to a connector (e.g., a floating connector) of a SATA data cable (not shown) that has been inserted through opening 418 into engagement with the fifth connector 415 of controller 411. The other end of the latter SATA data cable (not shown) can be coupled to a host. Similarly, an end of each power cable 417 can be inserted through an opening in frame 407, and connectors at cable 417's ends can be coupled between a power connector of one of the disk drives and one of connectors 412 of controller 411.

In a variation on the apparatus shown in FIGS. 7 and 8, elements 410 and 411 and the back portion of body 405 (to the right of line 405A drawn on body 405 in FIG. 7) are omitted. In alternative embodiment, the back face of the enclosure (configured to contain one, two, three, or four bare SATA disk drives) is the right face of frame 407 (viewed as in FIG. 8) and each disk drive secured within the enclosure in accordance with the invention can be coupled to external apparatus (e.g., an external SATA controller) by a SATA cable whose end is inserted through an opening (e.g., one of openings 408) in frame 407. Connectors at the ends of each such SATA cable could be coupled between the external apparatus and a complementary SATA connector of one of the disk drives locked in the enclosure.

With reference again to the embodiment shown in FIGS. 7 and 8, the above-mentioned "additional" circuitry of controller 411 is coupled to data and power connectors 412, 413, and 415, and includes circuitry configured to perform a data multiplexing function by which it routes data (received at any of connectors 415 from any one disk drive secured within the enclosure) to a host (coupled by a cable to another one of connectors 415), and routes data from the host to an appropriate one of the disk drives secured within the enclosure.

In some implementations, the data and power cables 416 and 417 that connect the disk drives to controller 411 do not have floating connectors. A power cable (not shown) can be coupled between connector 413A (shown in FIG. 7) of power supply 410 and connector 413 of controller 411, to allow power supply 410 to power all of the disk drives as well as controller 411.

Figure 9:
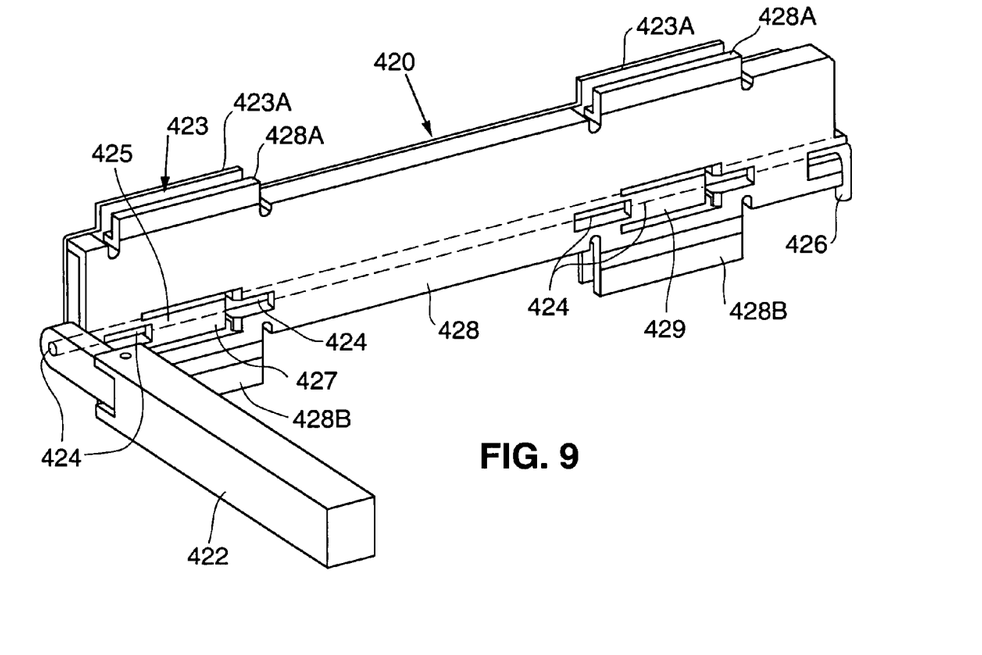
FIG. 9 is a perspective view of a flexible assembly of the FIG. 7 structure, which includes two flexible wall portions (425 and 429) and a pivoting arm (422).
Figure 10:
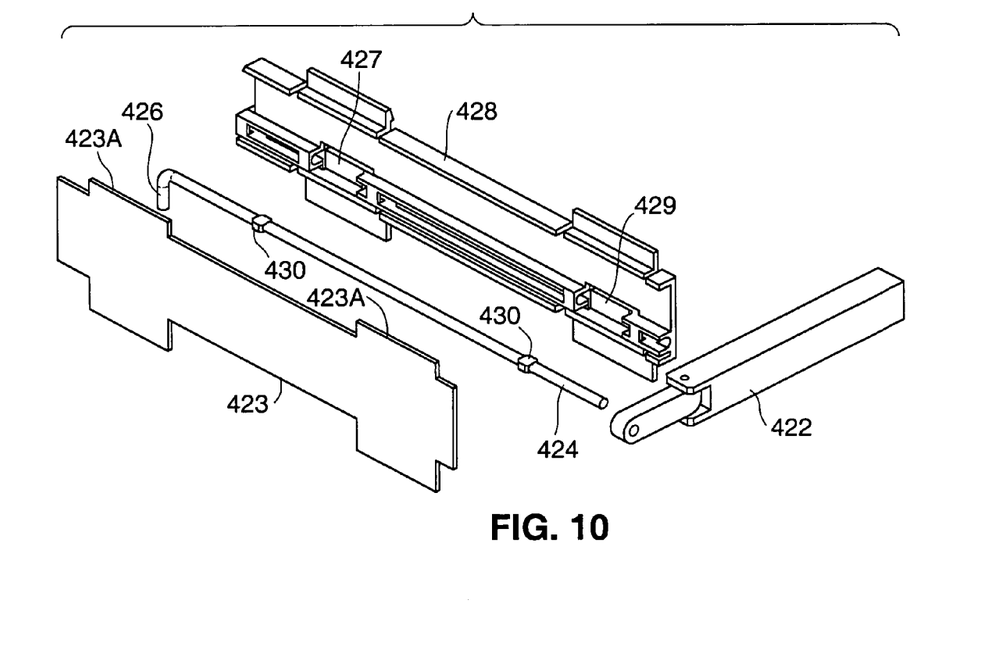
FIG. 10 is an exploded view of the flexible assembly of FIG. 9.
Figure 11:
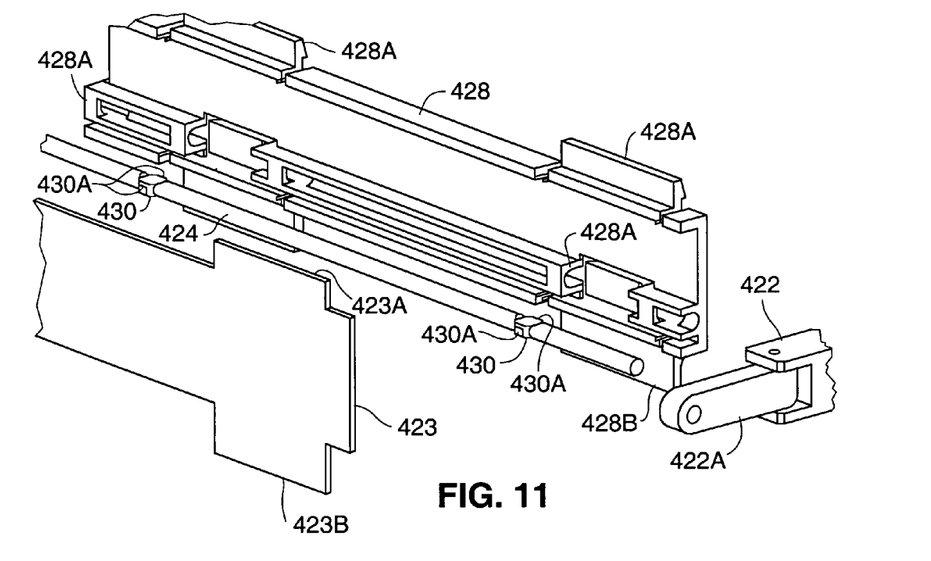
FIG. 11 is an enlarged version of a portion of FIG. 10.

The apparatus of FIGS. 7-11 includes four drive-locking assemblies 420 (also referred to herein as flexible assemblies), each for removably securing a different one of disk drives 400, 401, 402, and a fourth drive (not shown) within the enclosure. As best shown in FIGS. 9, 10, and 11, each flexible assembly includes a rigid element 423. In use, each element 423 is fixedly attached to frame 407 of the enclosure with flanges 423A of element 423 (and flanges 428A of element 428) extending through a pair of slots 407A of frame 407.

Each assembly 420 also includes wall element 428 (having two flexible wall portions 427 and 429), rod 424 having a bent end 426 (sometimes referred to herein as "hook" 426 of rod 424), two swaged cams 430 fixedly attached to rod 424 in the positions shown, and pivoting arm 422. When the apparatus is assembled, rod 430 is coupled to element 428 by inserting rod 424 through rod retaining portions 428A (best shown in FIG. 11) until each of cams 430 is aligned with one of flexible wall portions 427 and 429, so that rod 424 has freedom to slide longitudinally and rotate (about its longitudinal axis) relative to element 428. Rod 424 is attached to arm 422 by inserting rod 424's front end (the end opposite to end 426) within hole 422A of arm 422. When so assembled, rod 424 rotates as a unit with arm 422 relative to elements 423 and 428 when arm 422 is pivoted about hole 422A, and rod 424 translates longitudinally relative to elements 423 and 428 when arm 422 is pushed toward the enclosure or pulled away from the enclosure.

Then, to complete assembly of the elements shown (in exploded view) in FIG. 11, elements 423 and 428 are fitted together (with rod 424 therebetween, upper flanges 423A of element 423 aligned with upper flanges 428A of element 428, and lower flanges 423B of element 423 aligned with lower flanges 428B of element 428). The entire assembly 420 is then snapped into the enclosure by inserting two pairs of aligned flanges 423A and 428A through a pair of slots 407A of frame 407 and pairs of aligned flanges 423B and 428B into a corresponding pair of slots of body 405. All four assemblies 420 are assembled and snapped between frame 407 and 405 in this way.

When each assembly 420 has been assembled (e.g., as shown in FIG. 9) and snapped between frame 407 and body 405, a user can cause flexible wall portions 427 and 429 to move outward (out of the plane of FIG. 9, or into the plane of FIG. 11) into disk-drive locking positions, as follows. The user pivots arm 422 to rotate arm 422 and rod 424 together as unit (about the longitudinal axis of rod 424) into the angular position shown in FIG. 11 in which arm 422 is horizontal, radially protruding portion 430A of one cam 430 engages and pushes wall portion 427 into a disk-drive locking position, and radially protruding portion 430A of the other cam 430 engages and pushes wall portion 429 into a disk-drive locking position. To allow flexible wall portions 427 and 429 to move back (into the plane of FIG. 9, or out of the plane of FIG. 11) into unlocking positions, arm 422 is pivoted to rotate arm 422 and rod 424 together as unit (about the longitudinal axis of rod 424) into an angular position (rotated by 90 degrees from the position shown in FIG. 11) in which arm 422 is vertical and radially protruding portions 430A of cams 430 are disengaged from (and exert no force on) wall portions 427 and 429. In some implementations, flexible wall portions 427 and 429 are springs that are biased into their unlocking positions, so that they relax into the unlocking positions when cam portions 430A disengage from wall portions 427 and 429 (e.g., wall portions 427 and 429 comprise or consist of elastic material that springs into an unlocking configuration when cam portions 430A disengage from them). In other implementations, flexible wall portions 427 and 429 are not elastic springs that are biased into their unlocking positions, but move into unlocking positions when cam portions 430A disengage from wall portions 427 and 429 (e.g., wall portions 427 and 429 comprise or consist of nonelastic, flexible material, and are deformed by cam portions 430A into a locking configuration but fall into an unlocking configuration when cam portions 430A disengage from them).

Each flexible assembly 420 of FIGS. 7-11 has two states: a locking state in which cams 430 deform flexible elements 427 and 429 (by pushing them) into disk-drive locking positions; and an unlocking state in which there is sufficient clearance between each cam 430 and each flexible element (427 or 429) to allow elements 427 and 429 to relax (or be pushed) into unlocking positions that allow a disk drive (e.g. drive 400, 401, or 402) to be pulled out of the enclosure past elements 427 and 429. To secure a disk drive in the enclosure, a user rotates arm 422 into a vertical orientation so that arm 422 does not block entry of the drive into the enclosure and to position cams 430 to cause elements 427 and 429 to relax into their unlocking positions. The user then advances the disk drive into the enclosure until it reaches the position of drive 400, 401, or 402 of FIG. 7. As the disk drive advances into this forward position, the disk drive engages and pushes forward the hook 426 of rod 424, thereby advancing rod 424 and arm 422 together as a unit until cams 430 align with wall portions 427 and 429. Then, the user locks the drive by pivoting arm 422 into a horizontal orientation (as shown in FIGS. 10 and 11 and described above) to cause cams 430 to displace wall portions 427 and 429 into disk-drive locking positions.

To remove the drive from the enclosure, a user rotates arm 422 into a vertical orientation so that arm 422 does not block removal of the drive and to rotate cams 430 so that they disengage from elements 427 and 429 and allow elements 427 and 429 to relax into their unlocking positions. The user can then pull arm 42 to retract rod 424 (toward the left side of FIG. 9 and toward the right side of FIG. 11), causing rod 424's hook 426 to engage the disk drive's back face and pull the disk drive partially out of the enclosure. The partially retracted drive can be conveniently gripped by a user and pulled completely out from the enclosure. In a typical scenario, the removed drive is discarded, and replaced by another disk drive.

In some implementations of the embodiment described with reference to FIGS. 7-11 and in other embodiments of the invention (e.g., the embodiment to be described with reference to FIGS. 12-15), a storage component is removably secured in an enclosure by a spring-biased assembly having two states: a locking state in which at least one spring element (e.g., wall portions 427 and 429, or at least one spring) exerts spring force on the storage component to maintain the storage component in a locked position; and an unlocking state in which each spring element has relaxed away from the storage component to allow the storage element to move out of the locked position. Typically, the spring-biased assembly is moved between the two states by pivoting an arm.

In other embodiments of the invention, at least one flexible element (e.g., wall portion) that is not a spring (and is not spring biased into an unlocking position) is deformed by a cam into a storage component-locking position. When the cam is moved into an unlocking position, the flexible element either moves automatically (e.g., falls) into an unlocking position or can be displaced into an unlocking position by the action of pulling a storage component out of the enclosure past the flexible element.

Figure 12:
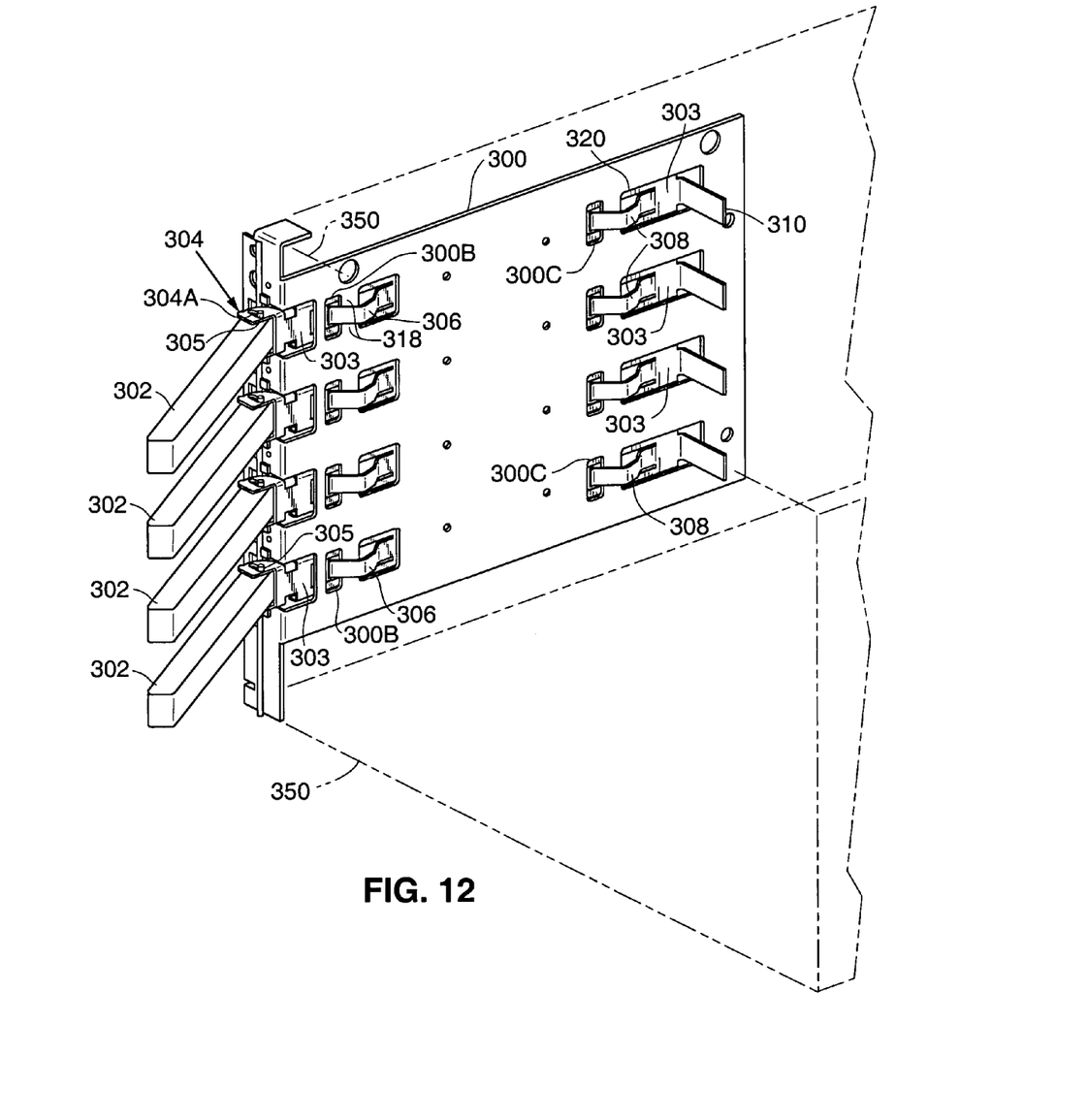
FIG. 12 is a perspective view of a spring-biased assembly that can be mounted to an enclosure (e.g., rectangular, box-shaped enclosure 350 shown in phantom view) to removably secure one, two, three, or four bare storage components in the enclosure in accordance with another embodiment of the invention. The FIG. 12 assembly includes four pairs of steel springs (each pair including a spring 306 and a spring 308) and an assembly including a pivoting arm 302 for controlling the position of each spring pair, and is shown in an unlocking state (in which it does not prevent the storage components from being removed from within the enclosure).

Next, with reference to FIGS. 12-15, we describe another embodiment of the invention that includes four drive-locking assemblies, each for removably securing a different disk drive (or other storage component) within rectangular, box-shaped enclosure 350 (shown in phantom view in FIG. 12). The drive-locking assemblies can removably secure one, two, three, or four bare disk drives in enclosure 350, each disk drive vertically separated from each other disk drive.

Figure 14:
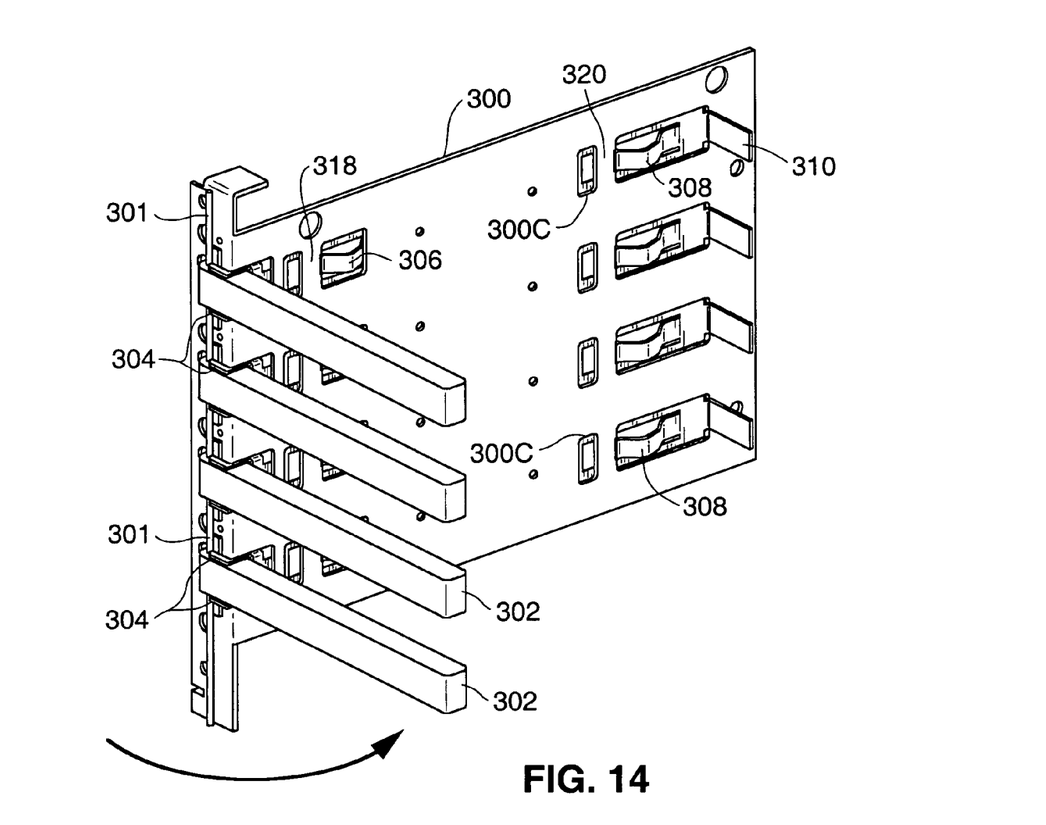
FIG. 14 is a perspective view of the spring-biased assembly of FIG. 12 in a locking state.
Figure 15:
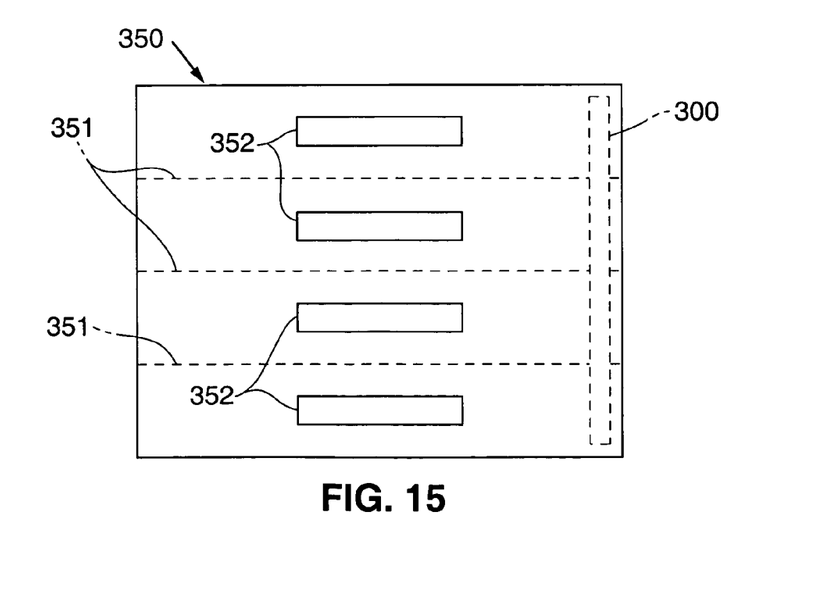
FIG. 15 is a front elevational view of enclosure 350 of FIG. 12.

FIG. 15 is a front elevational view of enclosure 350 of FIG. 12, showing horizontally oriented shelves 351 (in phantom view), each for supporting a different disk drive within enclosure 350. A fourth disk drive within enclosure 350 can rest on enclosure 350's bottom surface. Shelves 351 are not shown in FIG. 12 to avoid obscuring the other elements. Each drive-locking assembly includes a pivoting arm 302 and a metal (e.g., steel) element 303 pivotably attached to arm 302. The drive locking assemblies share rod 301 and vertically oriented rigid frame 300. A user can translate each element 303 (to the left in FIGS. 12 and 13) by pivoting the arm 302 attached thereto from the position shown in FIG. 12 (and 13) to the position shown in FIG. 14, and the user can translate each element 303 in the opposite direction (to the right in FIG. 12) by pivoting the arm 302 from the position shown in FIG. 14 to the position shown in FIG. 12 (or 13).

With reference again to FIG. 15, the front face of enclosure 350 defines four openings 352. When four disk drives are secured within enclosure 350 by locking assemblies that share frame 300 (shown in phantom view within enclosure 350 against the right wall of enclosure 350), a connector of each disk drive is accessible through one of openings 352. When each disk drive locked within enclosure 350 is a SATA disk drive having a SATA connector, each drive's SATA connector can conveniently be coupled to a SATA cable (e.g. cable 190 of FIG. 4) having a complementary SATA connector, by inserting the cable's complementary SATA connector through one of openings 352 into engagement with the drive's connector. Each such cable can also conveniently be decoupled from a drive locked within enclosure 350.

Figure 13:
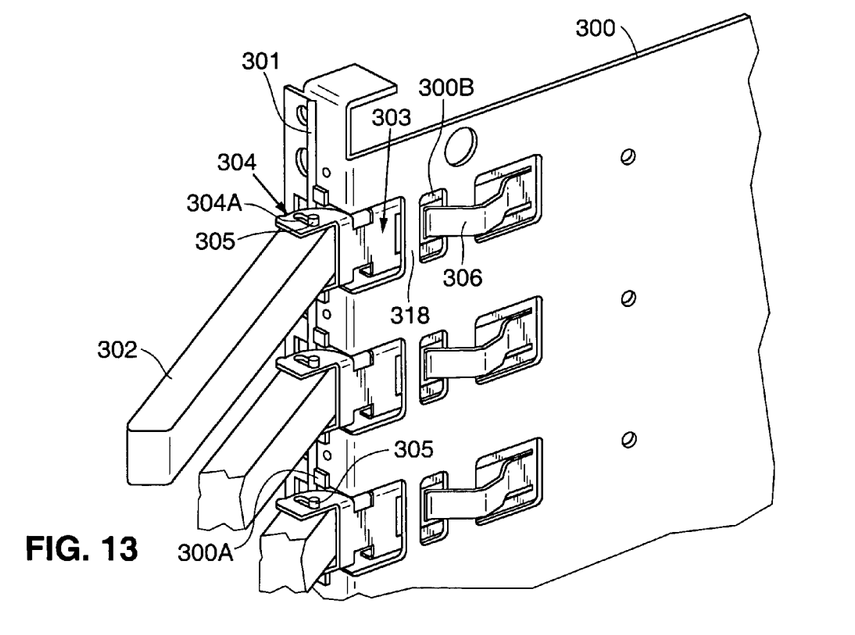
FIG. 13 is an enlarged version of a portion of FIG. 12.

As best shown in FIG. 13, each arm 302 has a hole near one end. To assemble the apparatus of FIGS. 12-14, arms 302 are positioned with their holes vertically aligned, and rod 301 is advanced through the aligned holes of arms 302 and through vertically aligned slots 300A of frame 300. In this way, rod 301 is attached to frame 300 in a vertical orientation and each of arms 302 is pivotably attached to rod 301 as shown.

Each arm 302 has a vertically oriented pin 305 positioned near to rod 301. Each element 303 has a pair of parallel flanges 304 at one end (as shown in FIGS. 13 and 14). The upper flange 304 of each element 303 defines a slot 304A. To assemble each element 303 with the rest of the apparatus, element 303 is positioned outside and generally parallel with frame 300 (with bent end portion 310 of element 303 protruding inward through an opening in frame 300), curved spring portion 308 of element 303 is positioned so as to extend inside portion 320 of frame 300 (as shown in FIGS. 12 and 13), curved spring portion 306 of element 303 is positioned so as to extend inside portion 318 of frame 300 (as shown in FIGS. 12 and 13), and flanges 304 of element 303 are positioned around above and below one of the arms 302, with pin 305 of arm 302 in slot 304A (as shown). Each of spring elements 306 and 308 is a curved flange of metal element 303.

When the apparatus of FIGS. 12-14 is assembled, a user can pivot arm 302 of each drive-locking assembly to move springs 306 and 308 of the drive-locking assembly between unlocking positions as shown in FIGS. 12 and 13 (in which they do not prevent a disk drive from being removed from within enclosure 350) and locking positions as shown in FIG. 14 (in which they lock a disk drive within enclosure 350).

More specifically, to secure a disk drive in enclosure 350, a user rotates arm 302 into the orientation shown in FIGS. 12 and 13, thereby preventing arm 302 from blocking entry of the drive into enclosure 350 and pulling element 303 toward the rear of enclosure 350 (toward the left of FIG. 12) to allow the ends of curved spring portions 306 and 308 to relax outward (through openings 300B and 300C in frame 300, respectively) into their unlocking positions. The user then advances the disk drive into the enclosure until the drive's front end engages (and pushes forward) bent end 310 of element 303, so that the force exerted by the drive on end 310 pushes element 303 forward into the position shown in FIG. 14, and the force exerted on pin 305 by forward-translating element 303 pivots arm 302 into the position shown in FIG. 14. As element 303 advances into the locking position shown in FIG. 14, the ends of curved spring portions 306 and 308, respectively, engage frame portions 318 and 320, and frame portions 318 and 320 exert bending force on spring portions 306 and 308 to bend them inward into their locking positions (shown in FIG. 14). In their locking positions, spring portions 306 and 308 exert spring force on the disk drive's side wall to secure (lock) the disk drive in its forward position. To remove the disk drive from enclosure 350, the user pivots arm 302 into the orientation shown in FIGS. 12 and 13, causing the ends of curved spring portions 306 and 308 of rearward-translating element 303 to relax outward (through openings 300B and 300C) into their unlocking positions as they retract past the rear edges of frame portions 318 and 320, respectively, and reach the openings 300B and 300C. Bent end 310 of the rearward-translating element 303 also assists in ejecting the disk drive from enclosure 350 by pushing it toward the rear of enclosure 350.

While this invention has been described in terms certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. An assembly, comprising:
   an enclosure configured to hold at least one storage component; and
   a locking apparatus for each said storage component, wherein each said locking apparatus is coupled to the enclosure, includes a movable control and has at least two states including a locking state and an unlocking state, each said locking apparatus in the locking state is configured to lock one said storage component within the enclosure with the locking apparatus coupled to the enclosure and is configured in the unlocking state to allow removal of said storage component from the enclosure while the locking apparatus remains coupled to the enclosure, and each said locking apparatus is configured to enter the locking state in response to movement of the control into a first position and to enter the unlocking state in response to movement of the control into a second position.

2. The assembly of claim 1, wherein the enclosure is configured to hold at least one bare storage component, each said locking apparatus in the locking state is configured to lock one said bare storage component within the enclosure and in the unlocking state to allow removal of said bare storage component from the enclosure.

3. The assembly of claim 1, wherein the enclosure is configured to hold at least one bare disk drive having at least one connector configured to be coupled to a complementary connector, and each said locking apparatus in the locking state is configured to lock one said disk drive within the enclosure such that the connector of said disk drive is accessible for coupling to the complementary connector.

4. The assembly of claim 1, wherein the enclosure is configured to hold at least one bare storage component having at least one data connector, the enclosure defines an opening for each said bare storage component, and the assembly also includes:
   a floating connector positioned in each said opening, wherein each said locking apparatus in the locking state is configured to lock one said bare storage component relative to one said opening such that the data connector of said storage component is accessible for coupling to the floating connector in said opening.

5. The assembly of claim 1, wherein the enclosure is configured to hold at least one bare SATA storage component, each said locking apparatus in the locking state is configured to lock one said SATA storage component within the enclosure and in the unlocking state to allow removal of said SATA storage component from the enclosure.

6. The assembly of claim 5, wherein the enclosure defines an opening for each said bare SATA storage component, each said SATA storage component has at least one SATA connector, and the assembly also includes:
 a floating SATA connector positioned in each said opening, wherein each said locking apparatus in the locking state is configured to lock one said SATA storage component relative to one said opening such that one said SATA connector of the SATA storage component is accessible for coupling to the floating SATA connector in said opening.

7. The assembly of claim 5, wherein one said SATA storage component is a bare disk drive, and wherein the assembly also includes:
 a SATA controller mounted in the enclosure; and
 a connector for the disk drive, wherein the connector is coupled to the controller and one said locking apparatus in the locking state is configured to lock the disk drive in a position coupled to the connector.

8. The assembly of claim 5, wherein one said SATA storage component is a bare disk drive having a SATA connector, the enclosure defines an opening for the disk drive, and the assembly also includes:
 a SATA controller mounted in the enclosure; and
 a floating SATA connector positioned in the opening and coupled to the controller, wherein one said locking apparatus in the locking state is configured to lock the disk drive relative to the opening such that the disk drive's SATA connector is coupled to the floating SATA connector.

9. The assembly of claim 1, wherein each said locking apparatus comprises:
 at least one flexible element; and
 at least one swaged cam for each flexible element, wherein each said locking apparatus is configured so that in the locking state at least one said cam deforms each said flexible element into a locking position, and in the unlocking state each said cam is positioned relative to each said flexible element to allow each said storage component to move past the flexible element.

10. The assembly of claim 9, wherein in the unlocking state there is sufficient clearance between each said cam and each said flexible element to allow one said storage component to move past the flexible element.

11. The assembly of claim 9, wherein each said locking apparatus is configured so that in the locking state at least one said cam pushes each said flexible element into the locking position.

12. The assembly of claim 9, wherein the movable control of each said locking apparatus includes an arm having freedom to pivot relative to the enclosure, and wherein each cam of the locking apparatus is configured to move into a deforming position in response to pivoting of the arm into a first position and to move into a disengaged position in response to pivoting of the arm into a second position, wherein said each cam in the deforming position is positioned to engage and deform one said flexible element.

13. The assembly of claim 1, wherein each said locking apparatus comprises:
 at least one spring; and
 a movable subassembly coupled to each said spring and configured in the locking state to cause each said spring to exert locking force on one said storage component and in the unlocking state to allow each said spring to relax away from the storage component.

14. The assembly of claim 13, wherein the movable control of each said locking apparatus includes an arm having freedom to pivot relative to the enclosure, and wherein the movable subassembly is configured to enter the locking state in response to pivoting of the arm into a first position and to enter the unlocking state in response to pivoting of the arm into a second position.

15. The assembly of claim 14, wherein each said locking apparatus includes a member coupled to the arm, the member is translatable relative to the enclosure in response to pivoting of the arm coupled thereto, and each spring of the locking apparatus is a flange of said member.

16. An assembly for removably securing at least two bare storage components, said assembly including:
 an enclosure configured to hold each of the storage components; and
 at least two locking assemblies, including a locking assembly for each of the storage components, wherein each of the locking assemblies is coupled to the enclosure, includes a movable control and has at least two states including a locking state and an unlocking state, each of the locking assemblies in the locking state is configured to lock one of the storage components within the enclosure with the locking apparatus coupled to the enclosure and is configured in the unlocking state to allow removal of said one of the storage components from the enclosure while the locking apparatus remains coupled to the enclosure, and each of the locking assemblies is configured to enter the locking state in response to movement of the control into a first position and to enter the unlocking state in response to movement of the control into a second position.

17. The assembly of claim 16, also including:
 at least two bare storage components removably secured within the enclosure.

18. The assembly of claim 17, wherein each of the bare storage components is a bare disk drive.

19. The assembly of claim 18, wherein each of the bare disk drives is a bare SATA disk drive.

20. The assembly of claim 19, also including:
 a SATA controller mounted in the enclosure; and
 connectors, wherein each of the connectors is coupled to the SATA controller and each of the locking assemblies in the locking state is configured to lock one of the bare SATA disk drives in a position coupled to one of the connectors.

21. The assembly of claim 19, wherein the enclosure defines an opening for each of the bare SATA disk drives, each of the bare SATA disk drives has a SATA connector, and the assembly also includes:
 a SATA controller mounted in the enclosure; and
 floating SATA connectors positioned in the openings and coupled to the controller, wherein each of the locking assemblies in the locking state is configured to lock one of the bare SATA disk drives relative to one of the openings such that said disk drive's SATA connector is coupled to the floating SATA connector.

22. The assembly of claim 16, wherein each said locking assembly comprises:
 at least one flexible element; and
 at least one swaged cam for each said flexible element, wherein said locking assembly is configured so that in the locking state at least one said cam deforms each said flexible element into a locking position.

23. The assembly of claim 22, wherein each said locking assembly in the unlocking state provides clearance between each cam and each flexible element of said locking assembly.

24. The assembly of claim 22, wherein each said locking assembly is configured so that in the locking state at least one cam of said locking assembly pushes each flexible element of said locking assembly into the locking position.

25. The assembly of claim 22, wherein the movable control of each said locking assembly includes an arm having freedom to pivot relative to the enclosure, and wherein each cam of the locking assembly is configured to move into a deforming position in response to pivoting of the arm into a first position and to move into a disengaged position in response to pivoting of the arm into a second position, wherein said each cam in the deforming position is positioned to engage and deform one said flexible element.

26. The assembly of claim 16, wherein each said locking assembly comprises:

at least one spring; and a movable subassembly coupled to each said spring and configured in the locking state to cause each said spring to exert locking force on one of the storage components and in the unlocking state to allow each said spring to relax away from said one of the storage components.

27. The assembly of claim 26, wherein the movable control of each said locking assembly includes an arm having freedom to pivot relative to the enclosure, and wherein the movable subassembly is configured to enter the locking state in response to pivoting of the arm into a first position and to enter the unlocking state in response to pivoting of the arm into a second position.

28. The assembly of claim 26, wherein each said locking assembly includes a member coupled to the arm, the member is translatable relative to the enclosure in response to pivoting of the arm coupled thereto, and each spring of the locking assembly is a flange of said member.

\* \* \* \* \*